United States Patent
Hu et al.

(10) Patent No.: US 11,007,482 B2
(45) Date of Patent: May 18, 2021

(54) DRAW SOLUTE AND AN IMPROVED FORWARD OSMOSIS METHOD

(71) Applicant: NANYANG TECHNOLOGICAL UNIVERSITY, Singapore (SG)

(72) Inventors: Xiao Hu, Singapore (SG); Yufeng Cai, Singapore (SG); Rong Wang, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 335 days.

(21) Appl. No.: 14/786,858

(22) PCT Filed: Apr. 28, 2014

(86) PCT No.: PCT/SG2014/000186
§ 371 (c)(1),
(2) Date: Oct. 23, 2015

(87) PCT Pub. No.: WO2014/175834
PCT Pub. Date: Oct. 30, 2014

(65) Prior Publication Data
US 2016/0082391 A1    Mar. 24, 2016

Related U.S. Application Data

(60) Provisional application No. 61/816,479, filed on Apr. 26, 2013.

(51) Int. Cl.
*B01D 61/00*    (2006.01)
*C02F 1/44*    (2006.01)
(Continued)

(52) U.S. Cl.
CPC ......... *B01D 61/005* (2013.01); *B01D 61/002* (2013.01); *C02F 1/445* (2013.01);
(Continued)

(58) Field of Classification Search
CPC ............... B01D 61/002; B01D 61/005; B01D 2311/10; B01D 2311/103; C02F 1/445;
(Continued)

(56) References Cited

U.S. PATENT DOCUMENTS

| 8,394,366 B2 * | 3/2013 | Yang ................... A61K 31/74 424/443 |
| 2006/0011544 A1 * | 1/2006 | Sharma ................ B01D 61/002 210/640 |

(Continued)

FOREIGN PATENT DOCUMENTS

EP    2489424 A1 *    8/2012    ........... B01D 61/002

OTHER PUBLICATIONS

Kudaivergenov et al. Semi-interpenetrating Polymer Networks of Polyelectrolytes. Eurasian ChemTech Journal 9 (2007) 177-192. (Year: 2007).*

(Continued)

*Primary Examiner* — Katherine Zalasky McDonald
(74) *Attorney, Agent, or Firm* — Harness, Dickey & Pierce, P.L.C.

(57) ABSTRACT

A draw solute for forward osmosis comprising a semi-interpenetrating (semi-IPN) hydrogel which comprises a thermally responsive polymer and a hydrophilic polymer, such that the semi-IPN hydrogel is capable of switching between a hydrophilic and hydrophobic state in response to changes in temperature is provided. Also provided is a draw solute comprising a hydrogel of a polyionic thermally responsive polymer, wherein the hydrogel switches between a hydrophilic state to allow absorption of water osmosed from a feed solution and a hydrophobic state to allow release of the absorbed water in response to changes in temperature. There is also provided a forward osmosis method comprising: contacting a feed solution and the draw solute via a (Continued)

semi-permeable membrane, such that feed water in the feed solution passes through the membrane by osmotic pressure and moves into the draw solute; and separating the water from the draw solute to form a purified water product.

18 Claims, 8 Drawing Sheets

(51) Int. Cl.

| | | |
|---|---|---|
| *C08L 33/26* | (2006.01) | |
| *C08L 101/14* | (2006.01) | |
| *C08L 33/08* | (2006.01) | |
| *C02F 103/08* | (2006.01) | |
| *C08L 33/24* | (2006.01) | |
| *C08L 33/12* | (2006.01) | |

(52) U.S. Cl.
CPC ............... *C08L 33/08* (2013.01); *C08L 33/26* (2013.01); *C08L 101/14* (2013.01); *B01D 2311/103* (2013.01); *C02F 2103/08* (2013.01); *C08L 33/12* (2013.01); *C08L 33/24* (2013.01); *Y02A 20/124* (2018.01)

(58) Field of Classification Search
CPC .. C02F 2103/08; Y02W 10/37; Y02A 20/124; Y02A 20/126; C08L 101/14; C08L 33/24; C08L 33/26; C08L 33/08
See application file for complete search history.

(56) References Cited

U.S. PATENT DOCUMENTS

| | | | |
|---|---|---|---|
| 2009/0220578 A1 | 9/2009 | King | |
| 2013/0017414 A1* | 1/2013 | He | ........................ C02F 3/005 429/2 |

OTHER PUBLICATIONS

Shin et al. Temperature-induced phase transition of semi-interpenetrating polymer networks composed of poly(n-isopropyl acrylamide) and hydrophilic polymers. Eur. Polym. J. vol. 34, No. 2 (1998) pp. 171-174. (Year: 1998).*

Yufeng Cai, et al., "Towards temperature driven forward osmosis desalination using Semi-IPN hydrogels as reversible draw agents", Water Research, 47 (2013) pp. 3773-3781, Article received Feb. 27, 2013, www.elsevier.com/locate/watres [retrieved on Aug. 6, 2014].

International Search Report and Written Opinion of the International Searching Authority for PCT/SG2014/000186 (in English), dated Aug. 13, 2014; ISA/AU.

Yamashita K. et al, "Preparation of IPN-type stimuli-responsive heavy-metal ion adsorbent gel", Polymers for Advanced Technologies, 14:189-194 (2003).

Li, Y. et al, "Study on the synthesis and application of salt-resisting polymeric hydrogels," Polymers for Advanced Technologies, 15(12):34-38 (2004).

Dan Li et al:, "Composite polymer hydrogels as draw agents in forward osmosis and solar dewatering", Soft Matter, vol. 7., No. 21, pp. 10048-10056 (Jan. 1, 2011).

Gamage et al., "Poly-N-Isopropylacrylamide/acrylic Acid Copolymers for the Generation of Nanostructures at Mica Surfaces and as Hydrophobic Host Systems for the Porin MspA from *Mycobacterium smegmatis*," J Phys. Chem. C Nanomater. Interfaces; 113(37): pp. 16485-16494 (Sep. 17, 2009), [retrieved on Sep. 7, 2018]. Retrieved from the Internet <URL:https://www.ncbi.nlm.nih.gov/pmc/articles/PMC2776743/>.

Stile, Ranee A. et al., "Poly(N-isopropylacrylamide)-Based Semi-interpenetrating Polymer Networks for Tissue Engineering Applications. 1. Effects of Linear Poly(acrylic acid) Chains on Phase Behavior," Biomacromolecules 2002, 3, pp. 591-600; DOI: 10.1021/bm0101466 (Published online Mar. 30, 2002).

Cai, Yufeng et al., "Towards temperature driven forward osmosis desalination using Semi-IPN hydrogels as reversible draw agents," *Water Research* (2013) 47, pp. 3773-3781; (Published Apr. 27, 2013) DOI: 10.1016/j.watres.2013.04.034.

* cited by examiner

DRAW SOLUTE AND AN IMPROVED FORWARD OSMOSIS METHOD

CROSS REFERENCE TO RELATED APPLICATIONS

This application is a U.S. National Phase Application under 35 U.S.C. 371 of International Application No. PCT/SG2014/000186 filed on Apr. 28, 2014. This application claims the benefit of priority from U.S. Provisional Application No. 61/816,479, filed on Apr. 26, 2013. The entire disclosures of all of the above applications are incorporated herein by reference.

FIELD OF INVENTION

The present invention relates to a draw solute for forward osmosis and an improved forward osmosis method using the draw solute.

BACKGROUND

It is recognised that forward osmosis desalination is a much less energy consuming process compared to reverse osmosis. There is also less fouling problems and higher water recovery by using the forward osmosis method compared to reverse osmosis method. However, the problem in the state of the art is the lack of a suitable draw solute to be used for forward osmosis. An ideal draw solute should generate a high osmotic pressure and subsequently a high water flux while being readily recovered and reused at low energy consumption. Other criteria such as low reverse ion diffusion, non-toxicity and minimal membrane degradation should also be present.

Commonly used draw solutes in the desalination of seawater via the forward osmosis process include sugar and ammonium bicarbonate. However, application of edible sugar as a draw solute is usually limited to emergency life saving hydration devices rather than large scale desalination. With respect to ammonium bicarbonate, the drawbacks include high reverse diffusion. Further, while the ammonium carbonate can be easily recovered by heating up to 65° C., the draw solute dissociates into carbon dioxide and ammonium, and inevitably some ammonium remains in the water and influences the product water quality.

Polymer decorated superparamagnetic nanoparticles have also been explored as draw solutes since the nanoparticles may be easily recovered by a magnetic field and provide a reasonable osmotic pressure owing to their nano-scale dimension. However, problems associated with the agglomeration of magnetic nanoparticles under a strong magnetic field and the consequent decreased osmotic pressure during reuse of such particles has not been resolved.

The possibility of using hydrogels as draw solutes for forward osmosis has also been investigated. In particular, hydrogels can absorb water through a forward osmosis membrane driven by swelling pressure and their insoluble cross-linked network enable dewatering under thermal and mechanical stimuli. An ionizable poly sodium acrylate (PSA) hydrogel produces a high water flux but only less than 5% of the absorbed water can be released at 50° C. and 3 MPa. Although poly(N-isopropylacrylamide) (PNIPAm) hydrogels are capable of releasing about 70% of the absorbed water, they have a low water flux.

An attempt of copolymerizing sodium acrylate and N-isopropylacrylamide to generate high water flux and facilely release water has been unsuccessful. The attempt of incorporating carbon particle into PSA hydrogels did produce high water flux and increase the water release under artificial sunlight exposure. However, only small portion of water released is in the liquid state. Moreover, the dewatering method of light exposure and long dewatering time render it difficult to make the desalination processes continuous.

There is therefore a need for an improved draw solute and an improved forward osmosis method which uses the improved draw solute which is able to generate high osmotic pressure, cause minimal membrane degradation and be effective in a scaled-up forward osmosis method.

SUMMARY

The present invention seeks to address at least one of the problems in the prior art, and provides an improved draw solute and an improved forward osmosis method using the draw solute.

According to a first aspect, the present invention provides a draw solute for forward osmosis comprising a semi-interpenetrating (semi-IPN) hydrogel, wherein the semi-IPN hydrogel comprises at least one thermally responsive polymer and at least one hydrophilic polymer, and wherein the semi-IPN hydrogel switches between a hydrophilic state to allow absorption of water osmosed from a feed solution and a hydrophobic state to allow release of the absorbed water in response to changes in temperature.

The semi-IPN hydrogel may comprise any suitable thermally responsive polymer and hydrophilic polymer. According to a particular aspect, the at least one thermally responsive polymer may be selected from the group selected from, but not limited to: poly(N-isopropylacrylamide) (PNIPAm), poly(N,N'-diethylacrylamide), poly(N-vinyl isobutylamide), poly(N-vinyllactam), polyvinylmethylether, poly(dimethylamino)ethyl methacrylate, poly(tributyl-hexyl phosphonium 3-sulfopropylacrylate), poly(tetrabutyl phosphonium p-styrene sulfonate), polypropylene oxide, copolymers and blends thereof.

According to a particular aspect, the at least one hydrophilic polymer may be selected from the group consisting of, but not limited to: polyacrylamide, polyethylene oxide, polysodium acrylate (PSA), polyvinyl alcohol (PVA), copolymers and blends thereof.

The semi-IPN hydrogel may be in any suitable form. For example, the semi-IPN hydrogel may be in the form of a bulk hydrogel, continuous film or particle aggregate.

According to a particular aspect, the semi-IPN hydrogel may be, but not limited to, PNIPAm/PSA, PNIPAm/PVA or a combination thereof.

According to a particular aspect, the semi-IPN hydrogel is capable of switching from the hydrophilic state to the hydrophobic state when the semi-IPN hydrogel is heated to a temperature above a lower, critical solution temperature (LCST) of the semi-IPN hydrogel. For example, the switching from the hydrophilic state to the hydrophobic state of the semi-IPN hydrogel may be when the semi-IPN hydrogel is heated to a temperature of 30-70° C.

According to a particular aspect, the draw solute may comprise a composite of semi-IPN hydrogel and particles of an inorganic material. For example, the inorganic material may be clay or continuous or discontinuous fillers. In particular, the continuous or discontinuous fillers may be carbon particles.

According to a second aspect, the present invention provides a forward osmosis method comprising:

contacting a feed solution and a draw solute via a semi-permeable membrane positioned therebetween, such that feed water in the feed solution passes through the semi-permeable membrane by osmotic pressure and moves into the draw solute, wherein the draw solute is a semi-interpenetrating (semi-IPN) hydrogel comprising at least one thermally responsive polymer and at least one hydrophilic polymer; and separating the water from the draw solute to form purified water product.

The thermally responsive polymer and the hydrophilic polymer may be any suitable polymer. In particular, the thermally responsive polymer and the hydrophilic polymer may be as described above.

The semi-IPN hydrogel may be any suitable semi-IPN hydrogel and may be in any suitable form. For example, the semi-IPN hydrogel may be as described above.

The feed solution may be any suitable feed solution. For example, the feed solution may be, but not limited to, aqueous saline solution, seawater, brine, brackish water, mineralized water, industrial waste water or a combination thereof. In particular, the feed solution may be seawater.

According to a particular aspect, the separating may comprise heating the draw solute. In particular, the heating may comprise heating at a temperature of 30-70° C.

According to a particular aspect, the contacting may be carried out at room temperature. In particular, the contacting may be carried out at about 25° C.

According to a particular aspect, the method may further comprise conditioning the draw solute prior to the contacting. In particular, the conditioning may comprise swelling the semi-IPN hydrogel prior to the contacting.

The semi-permeable membrane may be any suitable membrane. For example, the semi-permeable membrane may comprise hollow fibers. According to a particular aspect, the semi-permeable membrane may comprise hollow fibers which may be coated with at least one layer of the draw solute.

According to a third aspect of the present invention, there is provided a draw solute for forward osmosis comprising a hydrogel of at least one polyionic thermally responsive polymer, wherein the hydrogel switches between a hydrophilic state to allow absorption of water osmosed from a feed solution and a hydrophobic state to allow release of the absorbed water in response to changes in temperature.

The polyionic thermally responsive polymer may be any suitable polymer. For example, the polyionic responsive polymer may be selected from the group consisting of, but not limited to: polytetrabutylphosphonium p-styrene sulfonate, polytributylhexyl phosphonium 3-sulfopropyl methacrylate, polytributylhexyl phosphonium 3-sulfopropyl acrylate, polytetrabutylphosphonium maleate, polytetrabutylphosphonium fumarate, polyacrylamide, polyethylene oxide, copolymers and blends thereof.

The present invention also provides a forward osmosis method comprising:

contacting a feed solution and a draw solute according to the third aspect via a semi-permeable membrane positioned therebetween, such that feed water in the feed solution passes through the semi-permeable membrane by osmotic pressure and moves into the draw solute; and separating the water from the draw solute to form a purified water product.

The contacting and separating may be as described above.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION

Figure 1A:
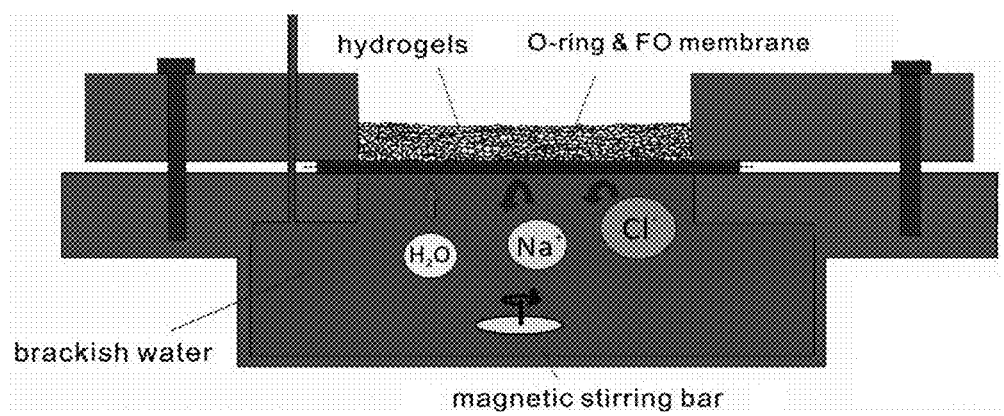
FIG. 1 shows: (a) a schematic representation and (b) a photographic representation of the set up to measure forward osmosis flux.

Forward osmosis desalination consumes less energy and has less membrane fouling problems compared to the widely used reverse osmosis technique to treat water. The forward osmosis desalination process allows water molecules to move from a feed solution to the osmosis draw solution by using an osmosis draw solution having a higher concentration than the feed solution, and then separates a draw solute from the osmosis draw solution, reuse it, and produce treated water. An important aspect of forward osmosis desalination is the use of an efficient and effective draw solute. In particular, the draw solute should have the following properties: generate high osmotic pressure or water drawing capability, be easily regenerated with less energy consumption, less or non-toxic, have less reverse diffusion into the feed solution and cause minimal or negligible membrane degradation.

The present invention relates to an improved draw solute. The present invention also relates to the use of suitable draw solutes in a forward osmosis method in order to effectively purify water from feed solution at low cost and low energy. In particular, the draw solute used in the method of the present invention lowers energy cost required in the separation and recovery of the purified water product during the forward osmosis process. The draw solute of the present invention has almost zero reverse diffusion, and is self-regenerated during the deswelling or de-watering process during the heating cycle.

The draw solute for forward osmosis may be a semi-interpenetrating (semi-IPN) hydrogel comprising at least one thermally responsive polymer and at least one hydrophilic polymer. The semi-IPN hydrogels may show thermally responsive swelling and dewatering behaviour. In particular, at suitable temperatures, the semi-IPN hydrogels rapidly release almost all the water absorbed during the forward osmosis process carried out at room temperature. Even more in particular, the method of the present invention provides low-energy consuming method in which the process is driven by temperature cycles within a moderate range.

According to a first aspect, the present invention provides a draw solute for forward osmosis comprising a semi-interpenetrating (semi-IPN) hydrogel, wherein the semi-IPN hydrogel comprises at least one thermally responsive polymer and at least one hydrophilic polymer, and wherein the semi-IPN hydrogel switches between a hydrophilic state to allow absorption of water osmosed from a feed solution and a hydrophobic state to allow release of the absorbed water in response to changes in temperature.

Any suitable semi-IPN hydrogel may be used for the purposes of the present invention. In particular, the semi-IPN hydrogel may comprise any suitable thermally responsive polymer and hydrophilic polymer.

The term "thermally responsive" refers to a characteristic of bringing about swelling and deswelling of the hydrogel as the temperature changes to achieve water absorption and water release during the forward osmosis process.

According to a particular aspect, the at least one thermally responsive polymer may be a polyionic thermally responsive polymer. The at least one thermally responsive polymer may be, but not limited to: poly(N-isopropylacrylamide) (PNIPAm), poly(N,N'-diethylacrylamide), poly(N-vinyl isobutylamide), poly(N-vinyllactam), polyvinylmethylether, poly (dimethylamino)ethyl methacrylate, poly(tetrabutyl phosphonium p-styrene sulfonate), poly(tributyl-hexyl phosphonium 3-sulfopropylacrylate), polypropylene oxide, polyacrylamide, polyethylene oxide, polytributylhexyl phosphonium 3-sulfopropyl methacrylate, polytetrabutylphosphonium maleate, polytetrabutylphosphonium fumarate, copolymers or blends thereof.

The poly(N-vinullactum) may be selected from the following:

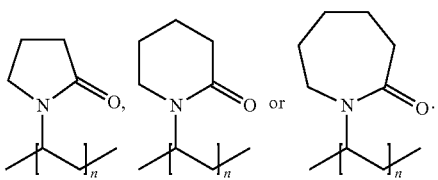

The hydrophilic polymer may be any suitable polymer. For example, the polymer may contain polar or charged functional groups to make the polymer hydrophilic and soluble in water. According to a particular aspect, the at least one hydrophilic polymer may be, but not limited to: polyacrylamide, polyethylene oxide, polysodium acrylate (PSA), polyvinyl alcohol (PVA), copolymers or blends thereof.

The semi-IPN hydrogel may be formed by any suitable method. In particular, the semi-IPN hydrogel may be formed by polymerizing the thermally responsive polymer in the presence of the hydrophilic polymer. For the purposes of the present invention, a semi-IPN hydrogel is defined as a polymer comprising one or more networks and one or more linear or branched polymer(s) characterized by the penetration on a molecular scale of at least one of the networks by at least some of the linear or branched macromolecules.

The semi-IPN hydrogel may be in any suitable form. For example, the semi-IPN hydrogel may be in the form of a bulk hydrogel, continuous film or particle aggregate. According to a particular aspect, the semi-IPN hydrogel may be coated on the semi-permeable membrane used in the forward osmosis method of the present invention. In particular, the semi-IPN hydrogel may be coated as a layer or as multiple layers on the surface of the semi-permeable membrane.

The semi-IPN hydrogel may be, but not limited to, PNIPAm/PSA, PNIPAm/PVA or a combination thereof. In particular, the PNIPAm/PSA may be formed by polymerizing N-isopropylacrylamide (NIPAm) in the presence of linear PSA. In particular, the PNIPAm/PVA may be formed by polymerizing N-isopropylacrylamide (NIPAm) in the presence of linear PVA. It would be understood by a person skilled in the art that reference to the semi-IPN hydrogels PNIPAm/PSA and PNIPAm/PVA is different from a copolymer of PNIPAm and PSA, and PNIPAm and PVA, respectively.

The semi-IPN hydrogel may be capable of switching from a hydrophilic state to a hydrophobic state when the semi-IPN hydrogel is heated to a temperature above a lower critical solution temperature (LCST) of the semi-IPN hydrogel.

The term "lower critical solution temperature (LCST)" refers to the lowest temperature at which the draw solute may be dewatered. The LCST is dependent on the draw solute. For example, the LCST may range from 30-60° C. In particular, the LCST of the draw solute may be 35-55° C., 37-52° C., 40-50° C., 45-48° C. Even more in particular, the LCST may be about 30-35° C. However, it would be clear to a person skilled in the art that the LCST may vary depending on the draw solute.

According to a particular aspect, the switching from the hydrophilic state to the hydrophobic state of the semi-IPN hydrogel may be when the semi-IPN hydrogel is heated to a temperature of 30-70° C. In particular, the switching may be at a temperature of 32-68° C., 35-65° C., 40-60° C., 45-58° C., 48-55° C., 50-53° C. Even more in particular, the switching may be at about 40° C. However, it would be clear to a person skilled in the art that the switching from the hydrophilic state to the hydrophobic state may be at a temperature which would depend on the draw solute since different draw solutes have different LCST.

The draw solute may comprise a composite of semi-IPN hydrogel and particles of an inorganic material. The particles may be continuous or discontinuous particles. For example, the inorganic material may be clay or carbon particles. The inorganic material may be incorporated into the semi-IPN hydrogel by any suitable method. For example, the inorganic material may be included together with the polymerizable monomers, initiators and cross-linkers at the time of preparing the semi-IPN hydrogel.

According to a second aspect, the present invention provides a forward osmosis method comprising:

contacting a feed solution and a draw solute via a semi-permeable membrane positioned therebetween, such that feed water in the feed solution passes through the semi-permeable membrane by osmotic pressure and moves into the draw solute, wherein the draw solute is a semi-interpenetrating (semi-IPN) hydrogel comprising at least one thermally responsive polymer and at least one hydrophilic polymer; and separating the water from the draw solute to form purified water product.

Any suitable semi-IPN hydrogel may be used for the purposes of the present invention. In particular, the semi-IPN hydrogel may be as described above.

Any suitable feed solution may be used for the method of the present invention. For example, the feed solution may be, but not limited to, aqueous saline solution, seawater, brine, brackish water, mineralized water, wastewater or a combination thereof. In particular, the feed solution may be seawater. Even more in particular, the feed solution may be seawater to be purified with the forward osmosis method to obtain fresh water.

The contacting may be carried out at room temperature. In particular, the contacting may be carried out at about 25° C.

The separating may be carried out under suitable conditions. For example, the separating may comprise heating the draw solute. The separating may comprise heating the draw solute above the lower critical solution temperature (LCST) of the draw solute. The term "lower critical solution temperature (LCST)" may be as defined above. It would be clear to a person skilled in the art that the LCST may vary depending on the draw solute used in the method. For example, the LCST may range from 30-60° C. In particular, the LCST of the draw solute may be 35-55° C., 37-52° C., 40-50° C., 45-48° C. Even more in particular, the LCST may be about 30-35° C.

According to a particular aspect, the separating may comprise heating the draw solute at a temperature of 35-70° C. In particular, the heating may be carried out at a temperature of 32-68° C., 35-65° C., 40-60° C., 45-58° C., 48-55° C., 50-53° C. Even more in particular, the heating may be carried out at about 40° C. However, it would be clear to a person skilled in the art that the heating may be at a suitable temperature such that the temperature is above the LCST. Accordingly, the heating may be carried out at a suitable temperature which would depend on the draw solute since different draw solutes have different LCST.

According to a particular aspect, the contacting comprises contacting the draw solute and feed solution with the semi-permeable membrane such that water molecules from the feed solution penetrate the semi-permeable membrane and into the draw solute, thereby swelling the draw solute. The solutes in the feed solution are rejected by the semi-permeable membrane. Subsequently, the separating may comprise immersing the swollen draw solutes into pure water with temperature higher than the LCST of the draw solute to cause the draw solute to shrink. In this way, the desalinated water flows along the warm medium, such as air, to ensure the water is released from the draw solute. During the entire forward osmosis method, the temperature shift from the contacting and separating is small. Therefore, the energy input in the separating is small and may be obtained from industrial waste heat. Further, the heat released for the purified water to cool down may be exploited by heat exchanger to make the forward osmosis method more energy efficient.

The duration of the contacting and the separating may be determined by the property of the draw solute, the conditions under which separating takes place, and the contact area and contact conditions between the draw solution, semi-permeable membrane and draw solute during the contacting.

According to a particular aspect, the method may further comprise conditioning the draw solute prior to the contacting. In particular, the conditioning may comprise swelling the draw solute prior to the contacting. The conditioning ensures that the equilibrium swollen state of the draw solute is reached prior to the contacting. The conditioning may be carried out under suitable conditions. For example, the conditioning may comprise immersing the draw solute in water at a temperature which is the same as the temperature at which the separating takes place. In particular, the conditioning may comprise immersing the draw solute in water at a temperature of about 40° C.

The semi-permeable membrane may be any suitable membrane for forward osmosis. In particular, the semi-permeable membrane may be a semi-permeable separation layer for forward osmosis which is permeable for water and non-permeable for the subject materials to be separated. The semi-permeable membrane may be in any suitable form. For example, the semi-permeable membrane may comprise hollow fibers. According to a particular aspect, semi-permeable membrane may comprise hollow fibers which may be coated with at least one layer of the draw solute. According to a particular aspect, the draw solute and the semi-permeable membrane may be attached to each other by means of Van der vaal's forces, covalent bond, ionic interaction, barometric pressure and the like. According to another particular aspect, the draw solute may be formed on semi-permeable membrane.

According to a third aspect of the present invention, there is provided a draw solute for forward osmosis comprising a hydrogel of at least one polyionic thermally responsive polymer, wherein the hydrogel switches between a hydrophilic state to allow absorption of water osmosed from a feed solution and a hydrophobic state to allow release of the absorbed water in response to changes in temperature.

The polyionic thermally responsive polymer may be any suitable polymer. In particular, the polyionic thermally responsive polymer may be any suitable polymer formed from an ionic liquid monomer. For example, the polyionic thermally responsive polymer may be selected from the group consisting of, but not limited to: polyacrylamide, polyethylene oxide, polytetrabutylphosphonium p-styrene sulfonate, polytributylhexyl phosphonium 3-sulfopropyl methacrylate, polytributylhexyl phosphonium 3-sulfopropyl acrylate, polytetrabutylphosphonium maleate, polytetrabutylphosphonium fumarate, copolymers and blends thereof. The respective monomers of the polyionic responsive polymers are as shown in Table 1.

According to a particular aspect, the draw solute comprising the polyionic thermally responsive polymer may be a semi-IPN hydrogel. The semi-IPN hydrogel may be as described above.

The present invention also provides a forward osmosis method comprising:
  contacting a feed solution and a draw solute according to the third aspect via a semi-permeable membrane positioned therebetween, such that feed water in the feed solution passes through the semi-permeable membrane by osmotic pressure and moves into the draw solute; and
  separating the water from the draw solute to form a purified water product.

The contacting and separating may be as described above.

The semi-permeable membrane used for in the method may be as described above.

According to a particular aspect, the method may further comprise conditioning the draw solute prior to the contacting. The conditioning may be as described above.

TABLE 1

Structural formula of different monomers forming the thermally-responsive polymers

| Monomer | Structure |
|---|---|
| tetrabutylphosphonium p-styrene sulfonate | |
| tributylhexyl phosphonium 3-sulfopropyl methacrylate | |
| tributylhexyl phosphonium 3-sulfopropyl acrylate | |
| tetrabutylphosphonium maleate | |
| tetrabutylphosphonium fumarate | |

According to a particular aspect, the draw solute may further comprise a composite of the hydrogel and inorganic material. The inorganic material may be inorganic particles. The inorganic particles may be any suitable particle or fillers. For example, the inorganic particle may be continuous or discontinuous particles. For example, the inorganic material may be clay or carbon particles. The inorganic material may be incorporated into the hydrogel by any suitable method. For example, the inorganic material may be included together with the polymerizable monomers, initiators and cross-linkers used in forming the polyionic thermally responsive polymer.

Having now generally described the invention, the same will be more readily understood through reference to the following examples which are provided by way of illustration, and are not intended to be limiting.

EXAMPLES

Example 1

Materials

N-isopropylacrylamine (NIPAm, ≥0.98%) was purchased from Wako Pure Chemical Industries Ltd. (Japan). N,N'-methylenebis(acrylamide) (MBA) (≥99%, crosslinker), sodium acrylate (97%), polyvinyl alcohol (PVA, $M_w$=61,000) and N,N,N',N'-tetramethylethylenediamine (TEMED, accelerator, 99%) were purchased from Sigma-Aldrich. Ammonium peroxydisulfate (APS) (initiator, 98%) was purchased from Alfa Aesar. Linear PSA was prepared by free radical polymerization via standard methods (Li et al, 2004; Yamashita et al, 2003). Forward osmosis membranes made from cellulose triacetate (lot No. 110707-ES-1) were supplied by Hydration Technologies Inc. (HTI), USA. Deionized water (18 MΩ*cm) was used for all experiments; all chemicals were used as obtained.

Preparation of Hydrogels

The PNIPAm/PSA and PNIPAm/PVA semi-IPNs were synthesized by polymerizing NIPAm in the presence of linear PSA and PVA, respectively. As a comparison, PNIPAm/PSA copolymer hydrogel was synthesized by random copolymerization of NIPAm and SA. The feed compositions are summarized in Table 2.

TABLE 2

Synthesis compositions for hydrogels[a]

| Sample | Code | NIPAm (M) | SA (M) | PVA (M) | MBA[b] (mM) | APS[c] (mM) | TEMED[d] (mM) |
|---|---|---|---|---|---|---|---|
| 1M PNIPAm | PNIPAm | 1 | — | — | 20 | 10 | 10 |
| PNIPAm-co-PSA (0.8M:0.2M) | co-0.2PSA | 0.8 | 0.2 | — | 20 | 10 | 10 |
| PNIPAm-IPN-PSA (0.8M:0.2M) | SI-0.2PSA | 0.8 | 0.2[e] | — | 16 | 8 | 8 |
| PNIPAm-IPN-PVA (0.8M:0.2M) | SI-0.2PVA | 0.8 | — | 0.2 | 16 | 8 | 8 |
| PNIPAm-IPN-PVA (0.5M:0.5M) | SI-0.5PVA | 0.5 | — | 0.5 | 10 | 5 | 5 |

Key:
[a]Initiator, accelerator and crosslinker are 1 mol %, 1 mol %, 2 mol % with respect to monomer (NIPAm for all semi-IPNs; NIPAm and SA for copolymerization), respectively;
[b]In 2% (w/v) aqueous solution;
[c]In 10% (w/v) aqueous solution;
[d]In 5% (w/v) aqueous solution;
[e]Refers to concentration of PSA monomer unit.

The total repeat unit concentration was 1M. For example, to prepare SI-0.5PVA, the NIPAm concentration and PVA repeat unit were both 0.5M. In actual synthesis the predetermined amount of NIPAm, MBA and PSA or PVA were first dissolved in DI water at 70° C. under constant stirring until a homogeneous solution was made. The solution was then cooled to room temperature and bubbled with pure nitrogen for 30 minutes before TEMED and APS were added in sequence. The polymerization was carried out for 24 hours at room temperature. The semi-IPN hydrogels were washed with large quantities of DI water for 5 days with a change of water every 8 hours to leach the low molecular weight molecules.

Characterization

The hydrogels were immersed in DI water for 3 days to ensure that the equilibrium swollen state was reached. The swollen hydrogels were cut into disks with a diameter of 24 mm and thickness of approximately 3 mm, and then immersed into 40° C. water for 10 minutes to measure the dewatering profile. The excess free water on the hydrogel surface was removed by a gentle vacuum suction for 2 seconds before each weighing. The hydrogel disks after the deswelling measurement at 40° C. were dried in a vacuum oven at 50° C. until a constant weight ($W_d$) was reached, based on which the swelling ratios and water retentions during the deswelling period could be calculated. The swelling ratio is defined as $(W_t-W_d)/W_d$, where $W_t$ is weight of hydrogel at particular time during deswelling, $W_d$ is the weight for the completely dry state.

The lower critical solution temperature (LCST) of each hydrogel was determined by a differential scanning calorimeter (TA Q10 Modulated DSC, TA Instruments). The hydrogels were swollen to equilibrium before the differential scanning calorimetric (DSC) measurement. For each DSC measurement, approximately 20 mg of swollen hydrogel was placed into a hermetically sealed aluminium pan. The temperature range was from 20° C. to 50° C. at a heating rate of 3° C./min. Dry nitrogen was used for purging at a flow rate of 50 mL/min.

Hydrogel Dewatering and FO Draw Agent Assessment

Figure 1B:
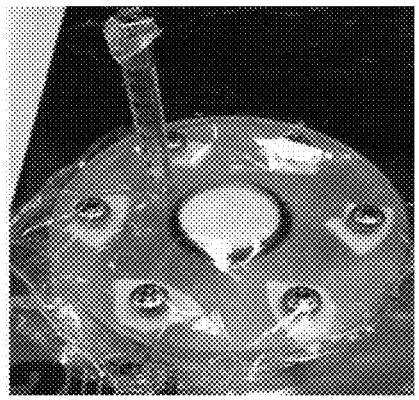
Figure 2:
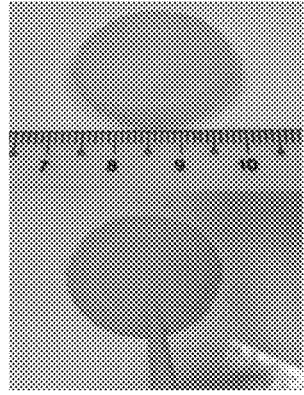
FIG. 2 shows an example of the semi-IPN hydrogel disc.

A 24 mm diameter, disk-shaped, hydrogel aggregate was fabricated using 400 mg of dry polymer particles of <200 μm in size. The disk was allowed to swell to a swelling ratio of approximately 2 to form an integral aggregate with a typical thickness of approximately 3 mm, as shown in FIG. 2. The swollen disk then was allowed to deswell at 40° C. in water. The deswelling profile was obtained by monitoring its weight decrease as a function of time. The hydrogel discs maintained excellent mechanical integrity during the swelling and deswelling studies. The hydrogel disc, after preconditioning by first swelling to a ratio of 2 followed by deswelling to an equilibrium plateau at 40° C., was then placed on the forward osmosis membrane to measure its performance as a draw agent for brackish water. The water flux is defined as $V/(A*t)$, where V is the volume (L) of water permeating through the membrane, A is the contact area (m$^2$) between the hydrogel and membrane, and t is the forward osmosis process time (h). The water flux measurement was conducted for 5 hours using an apparatus built in-house as shown in FIG. 1(a) and FIG. 1(b). The chamber filled with an aqueous solution of 2000 ppm NaCl (brackish water) and a forward osmosis membrane was sealed with a rubber O-ring that was compressed via screws. A small tube linked the chamber with the ambient air. The water level was maintained approximately 5 cm higher than the forward osmosis membrane to ensure that the brackish solution was always in contact with the forward osmosis membrane and that the hydraulic pressure in the small tube had a negligible effect. The water flux was determined by monitoring the hydrogel weight increase. Magnetic stirring in the brackish water was used to minimize concentration polarization. After the forward osmosis process the hydrogel disc was immersed into 40° C. water to release the absorbed water. The cycle was repeated 3 times to study the reversibility of these hydrogels as a forward osmosis draw solute.

Swelling and Deswelling of Semi-IPN Hydrogels

Figure 3:
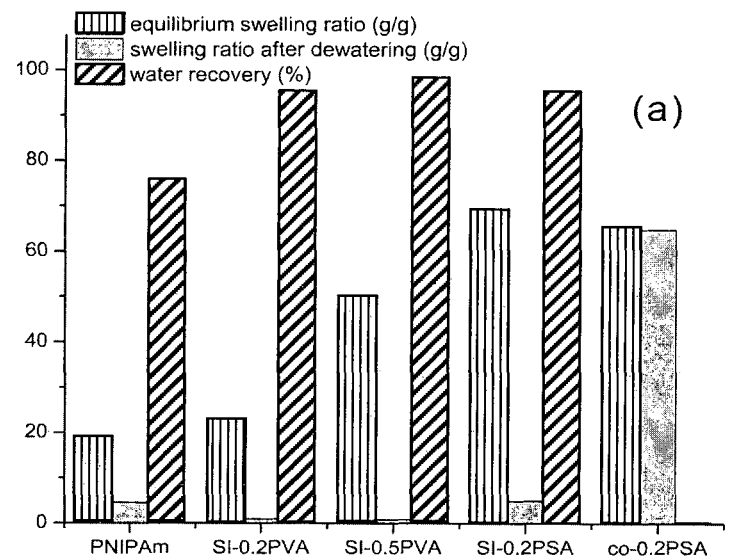
FIG. 3 shows (a) the equilibrium swelling ratio at room temperature, percentage water recovery after 10 minutes dewatering at 40° C. in water for the bulk hydrogels, and swelling ratio after complete dewatering of the hydrogels at 40° C. in water; and (b) deswelling profiles of hydrogel particle aggregate discs from a relatively low swelling ratio of 2. All the hydrogels had a dimension of 24 mm diameter and 3 mm thickness.
Figure 3:
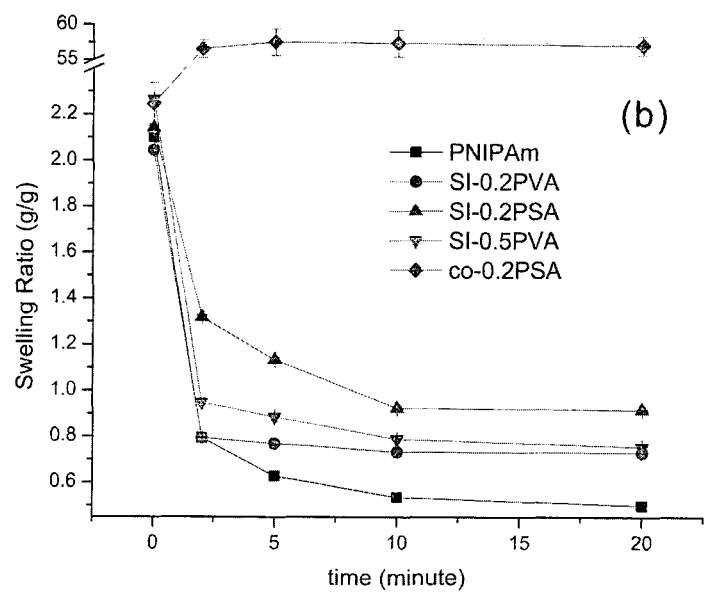

FIG. 3(a) shows that both hydrophilic linear PVA and PSA chains incorporated into the thermally responsive PNIPAm networks substantially increase the equilibrium swelling ratio of the hydrogels. Furthermore, all the semi-IPN hydrogels display excellent thermally responsive water recovery or dewatering efficiency at 40° C., with the resulting percentage recoveries being even higher than that for the pure PNIPAm hydrogel. This behaviour was attributed to the presence of linear hydrophilic chains, such as PSA or PVA, forming a type of water release 'channel', which enhances thermally induced water release even though the semi-IPN are more hydrophilic than PNIPAm. Although the NIPAm-SA copolymer hydrogel (co-0.2PSA), which has the same chemical composition as the semi-IPN (SI-0.2PSA), also shows similar improved equilibrium swelling ratio, the copolymer hydrogel gives virtually no water recovery efficiency under the same conditions. The PNIPAm and the semi-IPN hydrogel discs formed from particle aggregates can rapidly dewater and shrink from even a low swelling ratio (SR) of about 2 at 40° C. (FIG. 3(b)). All the thermally responsive semi-IPN hydrogels reached equilibrium, i.e., the minimum plateau swelling ratio at 40° C., after only 10 minutes of deswelling, while the NIPAm-SA copolymer continues absorbing water at the same temperature and shows no water release. In this example, the focus is on the dewatering behaviour of the hydrogels from a low initial swelling ratio of 2, although studying the dewatering behaviour of the hydrogels from a high swelling ratio (e.g., from their maximum or equilibrium swell ratios) is still useful (FIG. 3(a)). For observing the use of the hydrogels as draw solvents in a forward osmosis process, it is more relevant to understand the dewatering from a low swelling ratio because the water flux generated by the hydrogels diminishes when the swelling ratio is higher than 2 according to this example. The rapid and efficient thermally induced water recovery (dewatering) of the semi-IPN hydrogels at the low swelling ratio is an advantageous characteristic for the semi-IPN hydrogels for use as draw solutes, which will be discussed in more detail below. For better comparison, the plateau swelling ratio at 40° C. was defined as the onset point swelling ratio (OPSR) from which the hydrogels start to draw water across the membrane in the forward osmosis process. In other words, for the subsequent forward osmosis process studies, all hydrogels were first pre-conditioned at 40° C. before being used as draw solutes. Based on FIG. 3(b), the OPSRs for PNIPAm, SI-0.2PVA, SI-0.5PVA and SI-0.2PSA are 0.50±0.01, 0.73±0.01, 0.75±0.01 and 0.92±0.01 respectively. The hydrophilic polymer, especially ionic PSA, enhances the OPSR due to its affinity for water molecules; however, the thermo-sensitivity is preserved and makes it possible for semi-IPNs to effectively release water under a thermal stimulus. Another point worth discussing is the deswelling distinction between SI-0.2PSA and co-0.2PSA despite their similar room temperature equilibrium swelling ratios. Ionic SA incorporated during the copolymerization with NIPAm would increase the copolymer's LCST to higher than 80° C. with the SA/NIPAm ratio of 1:4 for co-0.2PSA, while the semi-IPN hydrogel with the same SA/NIPAm dose ratio maintained the PNIPAm's thermo-sensitivity. This distinction can be ascribed to the charge distribution inside the hydrogels. Randomly distributed charges from copolymerization would jeopardize the formation of hydrophobic aggregates due to the hydration of immobilized $COO^-$ and $Na^+$ ions as well as strong electrostatic repulsion; while the localized charge from semi-IPN and the mobility of the linear polymer mitigate these influences on the hydrophobic aggregate formation.

Figure 4:
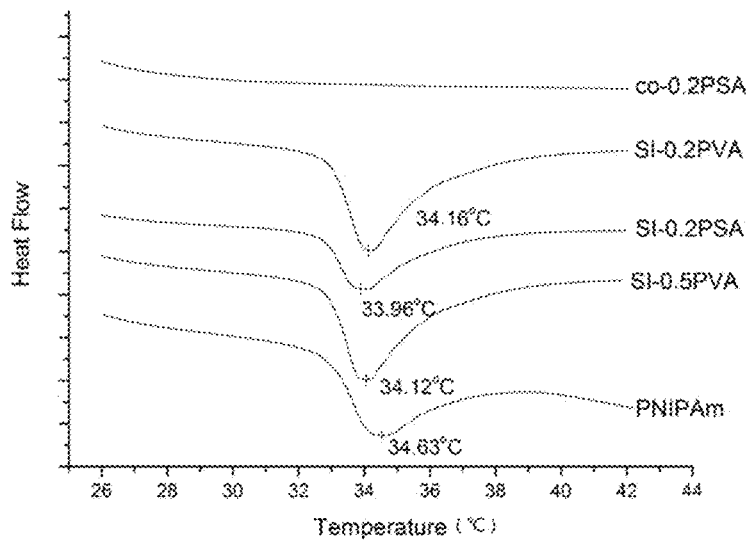
FIG. 4 shows differential scanning calorimetric (DSC) traces of the hydrogels showing the lower critical solution temperature (LCST) transition in the hydrogels.

FIG. 4 shows that all the semi-IPN hydrogels are thermally sensitive with LCSTs between 33 to 35° C. close to that of the PNIPAm. Interestingly, the LCSTs of the semi-IPN hydrogels are counter-intuitively lower than those of the PNIPAm. This phenomenon was ascribed to a unique effect due to hydrogen bonding between PVA and PNIPAm for PNIPAm/PVA semi-IPNs. While there still may be hydrogen bonding between PSA and NIPAm, the PSA, being a polyelectrolyte, may have an effect analogous to other inorganic electrolytes (e.g., NaCl or NaNO3), which were shown to have caused the lowering of the LCST of PNIPAm. The existence of the LCSTs in the semi-IPNs containing linear hydrophilic polymers is the basis for these hydrogels to have a substantially higher swelling ability than the PNIPAm while maintaining an excellent thermally responsive behaviour. Note that no LCST was detected in the same temperature range for the NIPAm-SA copolymer co-0.2PSA (see FIG. 4).

Forward Osmosis Process and Reversibility

Figure 5:
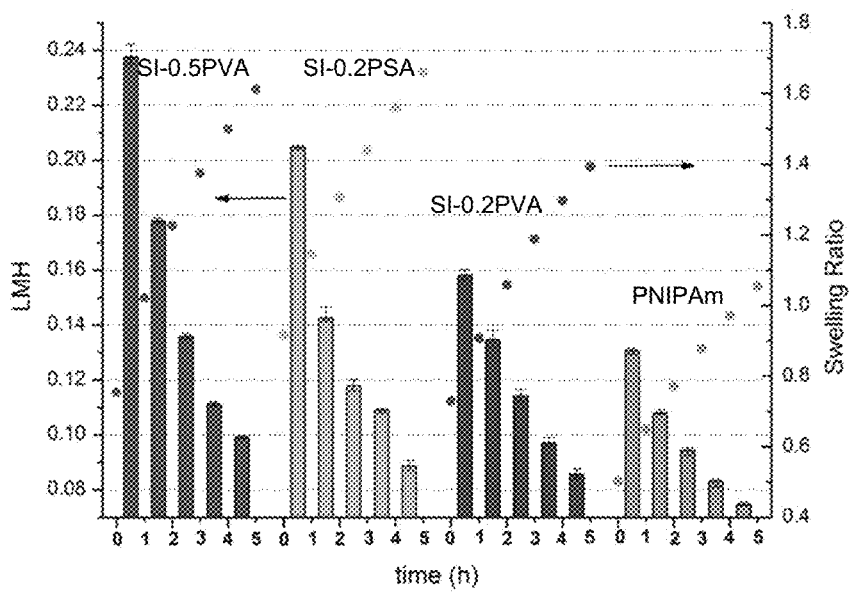
FIG. 5 shows the average water flux generated by the hydrogels during each hour (column) and the corresponding swelling ratio (dot) in the forward osmosis experiments. The column represents the average flux calculated from the weight increment in the hydrogel during each hour. For example, the first column of each hydrogel represents the average water flux generated in the first hour, and the first two dots are the swelling ratio before and after the first hour swelling. The dots at 0 hour represent the onset point swelling ratios (OPSRs)

In contrast to prior studies using hydrogels as a draw agent in which the one-time FO process was started with completely dry hydrogels, the forward osmosis process in this example started with partially-swollen hydrogels pre-conditioned to the respective OPSRs at 40° C. This is because in the subsequent cyclic reversibility study the dewatering was always carried out at 40° C. The pre-conditioned hydrogel discs at the OPSRs were then put onto the forward osmosis membrane as draw agents. FIG. 5 shows the water flux in liters per square meter per hour (LMH) and corresponding swelling ratio as a function of time for each hydrogel during the forward osmosis process. The incorporation of a linear hydrophilic polymer or polyelectrolyte imparts two contrasting effects on the forward osmosis process in terms of the water flux. On the one hand, a hydrophilic polymer, especially a polyelectrolyte, PSA, increases the water flux dramatically. For example, it is clearly visible in FIG. 5 that the all the semi-IPN hydrogels generate a higher water flux than the pure PNIPAm hydrogel; moreover, SI-0.2PSA generates a higher water flux than SI-0.2PVA. A more meaningful way to compare the ability to absorb water among the different hydrogels is to compare the water flux at the same swelling ratio. The plots of LMH versus swelling ratio for the hydrogels, shown in FIG. 6(a), clearly indicate the decreasing trend of flux with increasing swelling ratio. All the semi-IPN hydrogels generate a higher water flux than the PNIPAm hydrogel at each swelling ratio. For example, at a swelling ratio of 1, the water fluxes generated by the semi-IPN hydrogels are expected to be 0.18, 0.18 and 0.12 LMH for SI-0.2PSA, SI-0.5PVA and SI-0.2PVA, which are 2.6, 2.6 and 1.7 times the 0.07 LMH observed for the PNIPAm hydrogel. On the other hand, as discussed earlier (FIG. 3(b)), the incorporation of PVA or PSA increases the OPSRs which are the points from which the forward osmosis process commences (OPRS was earlier defined as the plateau swell ratio after dewatering at 40° C. with reference to FIG. 3). Therefore, the semi-IPNs as draw agents were operated at higher swelling ratios than the PNIPAm. This is disadvantageous in terms of water flux. Fortunately, the enhancement of the drawing effect of PVA or PSA incorporation outweighs the negative effect of increasing the OPSR in the semi-IPNs as shown in FIG. 5. For example, the average water fluxes generated by SI-0.5PVA and SI-0.2PSA are still 85% and 58% higher than that of the PNIPAm for the first hour in the forward osmosis process.

Figure 6:
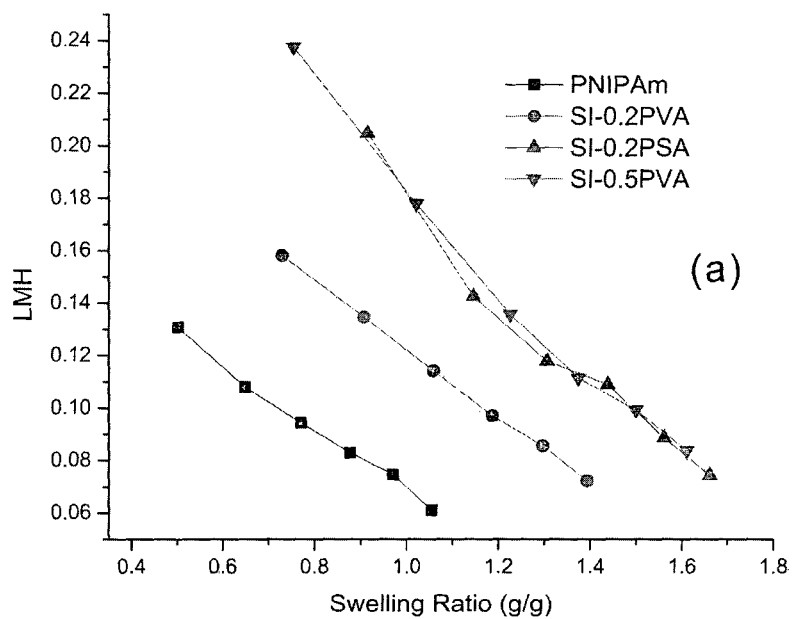
FIG. 6 shows: (a) the water flux and swelling ratio correlation curve for hydrogels for a 5 hour forward osmosis process; and (b) the schematic representation of the reversible hydrogel design optimization. The ideal situation is that the reversible hydrogel has a larger end point swelling ratio (EPSR) and lower OPSR simultaneously to enlarge the reversible span. The EPSR represents the swelling ratio at which the water flux reaches an arbitrary set value and OPSR shares the definition mentioned in the description below. The solid line represents the reversible span with the swelling ratio difference between EPSR and OPSR.
Figure 6:
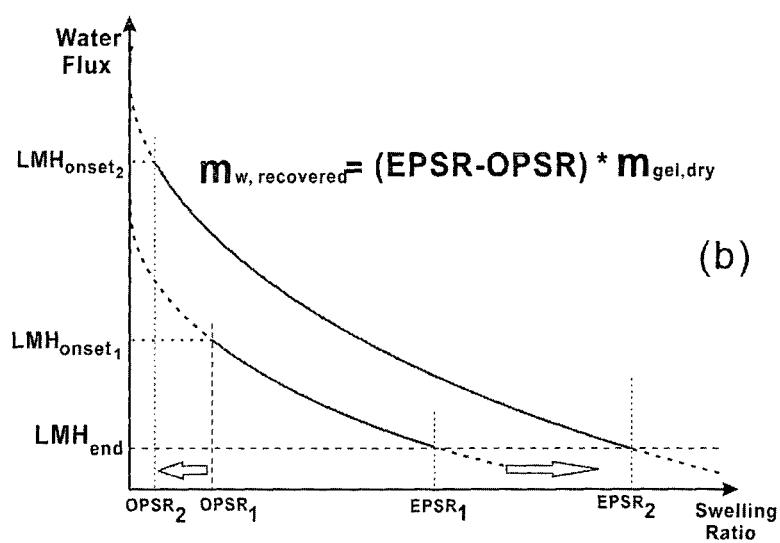

The competition between these two effects for the three semi-IPNs also determines their performance in the forward osmosis process. At the same swelling ratio, the water flux generated by the SI-0.2PSA (0.183LMH at SR=1) is virtually the same as that for the SI-0.5PVA (0.177LMH at SR=1), as seen in FIG. 6(a). However, the SI-0.5PVA has a lower OPSR and therefore a larger swelling ratio difference between the swelled state (at room temperature) and deswelled state (at 40° C.) than that observed for the SI-0.2PSA during the forward osmosis process. Actually in using reversible hydrogels as draw solutes, the reversible swelling ratio span (between the drawing and dewatering temperatures) is also a critical parameter to be considered besides the LMH values. For example, FIG. 6(a) shows that during the forward osmosis process, the swelling ratios increased in comparison to their OPSRs by 0.54, 0.66, 0.74 and 0.87 for PNIPAm, SI-0.2PVA, SI-0.2PSA and SI-0.5PVA, respectively. This means that while SI-0.2PSA drew and recovered 37% more water than PNIPAm, the SI-0.5PVA drew and recovered 61% more water than PNIPAm, even though they have generated similar water fluxes at the same swelling ratio. In fact, the LMH versus SR plots in FIG. 6(a) for SI-0.2PSA and SI-0.5PVA virtually overlap each other. In order to further understand the forward osmosis drawing and dewatering performance of the hydrogels, it is useful to introduce the reversible swelling ratio span parameter, which is the difference between the OPSR (defined earlier) and the EPSR (end point swelling ratio). The EPSR is the swelling ratio of the hydrogel at the end of the room temperature forward osmosis drawing process, prior to the dewatering process by heating to 40° C. FIG. 6(b) schematically shows that during the forward osmosis process using a hydrogel as the draw solute, the hydrogel swells from the OPSR to the EPSR while the water flux reduces from $LMH_{onset}$ to $LMH_{end}$. Because of their thermally responsive behaviour, the swollen hydrogels will undergo dewatering and shrink to the OPSR upon heating to 40° C. This allows the next cycle of forward osmosis drawing using the dewatered hydrogels. The amount of water, $m_{w,recovered}$, that can be recovered from a hydrogel during one forward osmosis drawing and de-watering cycle is determined by the reversible swelling ratio span, i.e., EPSR–OPSR. In fact, $$m_{w,recovered} = (EPSR-OPSR) \times m_{gel,dry},$$

where $m_{gel,dry}$ is the mass of the dried hydrogel used. If for ease of comparison between the hydrogels in this example the EPSR is defined to be the SR when the water flux is reduced to 0.1 LMH, the EPSRs of the PNIPAm and the semi-IPN hydrogels can be determined from FIG. 6(a). Table 3 tabulates the values of the OPSR, EPSR and (EPSR–OPSR) of these hydrogels.

TABLE 3

OPSR, EPSR and the reversible swelling ratio span of the PNIPAm and the semi-IPN hydrogels. Note that the EPSR is defined as the swelling ratio when the water flux is reduced to 0.1 LMH.

| Hydrogel Code | OPSR | EPSR | EPSR-OPSR |
|---|---|---|---|
| PNIPAm | 0.50 | 0.72 | 0.22 |
| SI-0.2PVA | 0.73 | 1.18 | 0.45 |
| SI-0.2PSA | 0.92 | 1.50 | 0.58 |
| SI-0.5PVA | 0.75 | 1.50 | 0.75 |

It can be clearly seen that all the semi-IPN hydrogels have a higher EPSR than the PNIPAm hydrogel. The reversible swelling ratio spans (EPSR–OPSR) of the semi-IPN hydrogels are also larger than that of the PNIPAm hydrogel despite higher OPSRs for the semi-IPNs. For example, the reversible swelling ratio span for SI-0.5PVA is 0.75 (g/g) is 240% larger than that of the PNIPAm hydrogel. For the NIPAm and SA based hydrogels, the PSA is expected to have the highest swelling and drawing power and hence the highest EPSR. However, its OPSR is also high (virtually the same value as the EPSR because the PSA hydrogel is not expected to dewater at 40° C.). Hence the $m_{w,recovered}$ is virtually 0 during the thermal cycles between room temperature and 40° C. On the other hand, although the thermally responsive PNIPAm hydrogel has the lowest OPSR, its EPSR is also low. Hence, in either case, the amount of recovered water is small. For the semi-IPN hydrogels, the incorporated hydrophilic PVA or PSA chains not only increase the water flux and EPSR substantially, but also preserve the excellent thermally responsive properties. Although the OPSR values are higher in the semi-IPNs compared to the PNIPAm, they still yielded larger amounts of water during the temperature-driven forward osmosis drawing (at room temperature) and dewatering (at 40° C.) cycle. Therefore, balanced forward osmosis drawing and dewatering properties are the essential characteristics that make these semi-IPNs suitable candidates as forward osmosis draw agents. Accordingly, the draw solutes should comprise hydrogels with an OPSR after heat induced dewatering that is as low as possible and with an EPSR that is as high as possible for a given $LMH_{end}$ as suggested by FIG. 6(b).

Figure 7:
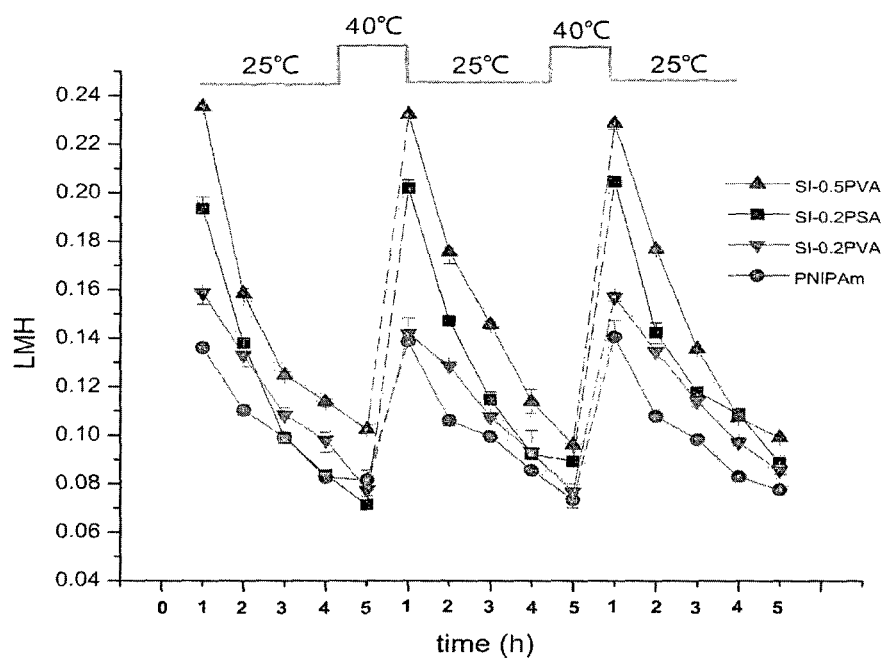
FIG. 7 shows the reversibility of hydrogels for three forward osmosis-deswelling cycles. The five dots in each cycle represent the average water flux for the corresponding one hour. The deswelling process (dashed line) duration is 10 minutes and is not to scale relative to the forward osmosis process duration.

FIG. 7 shows the water flux versus time for three consecutive cycles for the semi-IPN and the PNIPAm hydrogels, which indicates that the drawing and dewatering cycles are highly reversible. The reversibility of these hydrogels was imparted by the thermo-sensitivity of the PNIPAm structure, while incorporated hydrophilic linear polymers that enable the semi-IPN hydrogels to absorb and subsequently release more water during one cycle.

Quasi-Continuous Forward Osmosis Desalination Using a Semi-IPN Hydrogel

Figure 8:
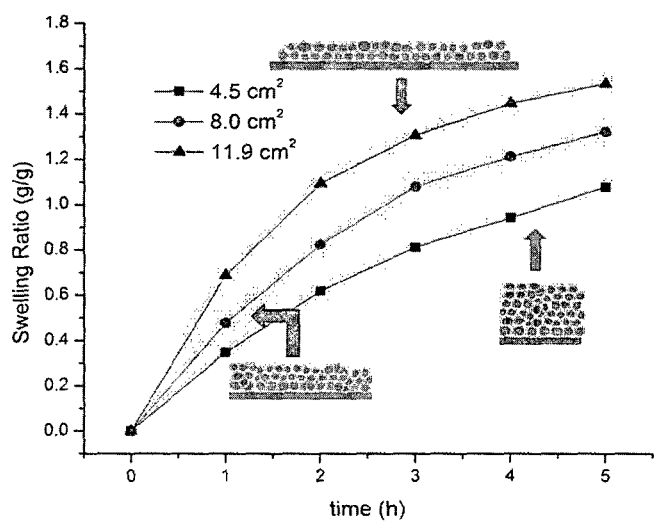
FIG. 8 shows the influence of membrane/hydrogel contact area on the forward osmosis performance of SI-0.2PSA. 2000 ppm brackish water is feed solution and the dry hydrogel weight in all three cases is approximately 400 mg.
Figure 9:
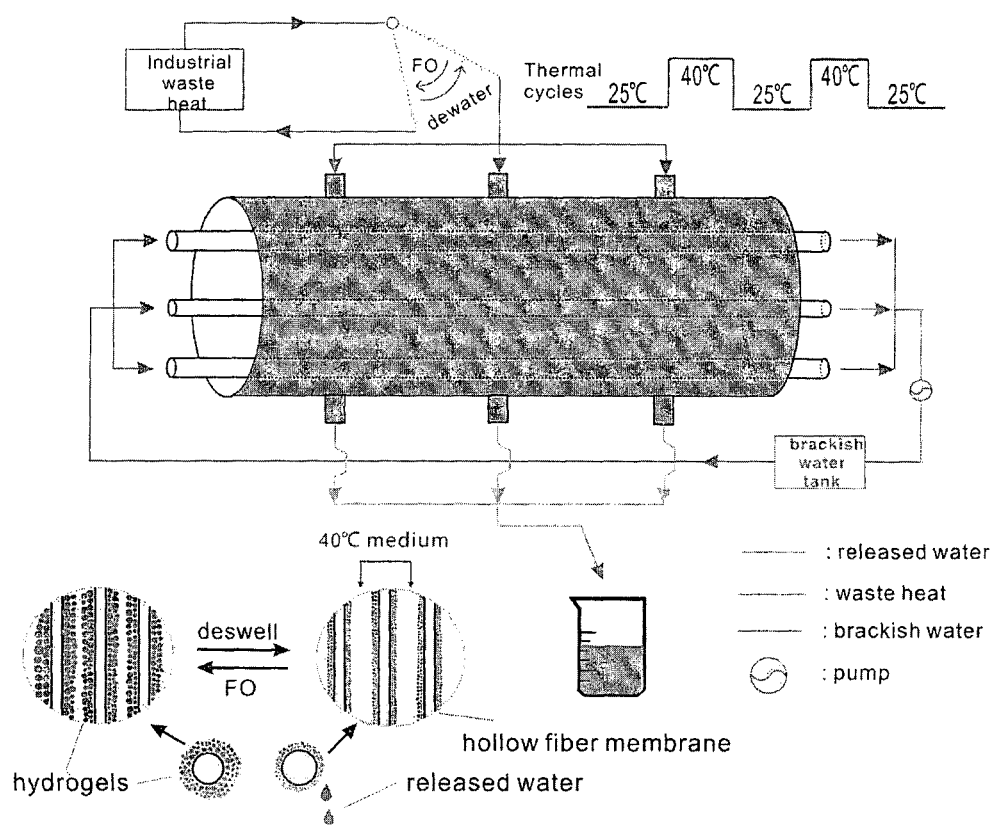
FIG. 9 shows a quasi-continuous forward osmosis desalination set-up using a semi-IPN hydrogel as the draw solute. Apart from the energy needed to pump the saline water feed through the lumen of the hollow fibers, the periodic temperature modulation within 15° C. (e.g., between 25 to 40° C.) is essentially the only driving force for desalination in this configuration. This temperature difference can be readily obtained using warm air generated from industrial waste heat.

Note that although the water flux (LMH) of hydrogel draw agents are still low compared to those of a solution based draw agent such as $NH_3HCO_3$, they are still interesting because hydrogels eliminate the need of draw solute regeneration during water treatment. Furthermore, flux does not always depict accurately the actual forward osmosis performance for hydrogel draw solutes since the LMH and drawing rate are significantly affected and tuned by the contact area between the hydrogel and the forward osmosis membrane. It is clearly seen in FIG. 8 that a larger contact area led to significantly faster water absorption. In this case, when a hydrogel of the same weight (400 mg) is spread onto a larger membrane area, the water diffusion path is decreased, thereby facilitating more rapid swelling. These results indicate that by optimizing the hydrogel thickness and its contact area with the forward osmosis membrane, better performance would result and the duration of the forward osmosis process can be further reduced. The semi-IPN hydrogels when used as draw solutes may be integrated into a forward osmosis hollow fiber module. FIG. 9 shows a conceptual design of a quasi-continuous temperature driven desalination module with a semi-IPN hydrogel coated onto the outside surface of the forward osmosis hollow fiber membranes. In the forward osmosis process the water from the feed solution (which flows through the lumen of the hollow fibers) permeates through the membrane at room temperature (e.g., 25° C.) due to drawing by the hydrogel as it swells. Subsequently the dewatering process is enabled by a moderate heating to 40° C. at which the swollen hydrogel releases the desalinated water. The 'cooling and heating' cycles as shown schematically in FIG. 9 can be continued to allow an essentially temperature-driven forward osmosis desalination.

The design is regarded as quasi-continuous since the desalinated water can be collected during each heat induced deswelling stage at 40° C. Using the semi-IPNs described above, a temperature modulation of about 15° C. (e.g., between 25 to 40° C.) may drive the desalination process. A mild dewatering condition of 40° C. is very important because it not only saves energy and reduces the cost, but also avoids possible membrane degradation. For example, it is known that 43° C. is the upper limit for long term housing of the forward osmosis membrane from HTI (HTI data sheet). The hydrogels swell to absorb water from the brackish water at a temperature below their LCST, while they deswell to release desalinated water for collection at a temperature above their LCST. Apart from the energy needed to pump the saline water feed through the lumen of the hollow fibers, the periodic temperature modulation is essentially the only driving force for desalination in this hydrogel enabled forward osmosis process. This temperature difference can be readily obtained using hot air/water generated from industrial waste heat. The temperature difference may be further reduced as required between the 'cooling and heating' cycles by modifying the hydrogels.

Other Preparations of the Draw Solute and Semi-Permeable Membrane (a) N-isopropylacrylamide (NIPAm) was dissolved in deionized water to make aqueous solution with concentration from 5 wt % to 25 wt %. Crosslinker N,N'-methylenebisacrylamide (MBA), N,N,N',N'-Tetramethylethyleneiamine (TEMED) as accelerator and initiator ammonium persulfate (APS) were added into the solution in various doses to polymerize the monomer. Hollow fiber membrane outer surface was on contact with the solution and the hydrogel was coated on the surface when the polymerization completed.

(b) N-isopropylacrylamide (NIPAm) and sodium acrylate (SA) were dissolved in deionized (DI) water to make aqueous solution with concentration from 5 wt % to 25 wt %. TEMED, APS and MBA were added and the hydrogel synthesized was dried and pulverized after through washing. The pulverized particles were used to fill the voids between hollow fiber membranes.

(c) NIPAm was polymerized and crosslinked by MBA, TEMED and APS in the presence of poly sodium acrylate. When the viscosity of the solution increased to sol-like, it was poured into the voids between the hollow fiber membrane bunches. The hydrogel was formed between the fibers and coated on the fiber membrane surface.

(d) The hydrogel was prepared with initial solutions consisting of NIPAm monomer, initiator (APS) and accelerator (TEMED) as well as clay Laponite-S as the crosslinker. Monomer concentration varied from 5 wt % to 25 wt %, and the Laponite-S concentration was from 6 wt % to 15 wt %. The premixed solution was poured into the voids between the fibers, and the hollow fiber membrane coated with hydrogels was fabricated.

CONCLUSION

A series of hydrogels based on PNIPAm-PSA and PNIPAm-PVA semi-IPNs with superior and balanced thermally responsive swelling and dewatering behaviour have been successfully prepared. They are shown to be suitable as draw solutes for continuous temperature driven forward osmosis desalination while the copolymer counterpart with the same chemical or monomer compositions showed no such potential.

Example 2

Fabrication of Hydrogels

For the preparation of tetrabutylphosphonium p-styrene sulfonate (P4444 SS) hydrogel, 44.8 mg of crosslinker polyethylene glycol dimethacrylate (0.226 mmol) and 20.6 mg of photo-initiator benzophenone (0.113 mmol) were dissolved in 5 g (11.3 mmol) of P4444 SS to make a homogeneous solution. Bulk polymerization was performed under 2 hour exposure to UV light. The hydrogel was then put in deionized water to leach out unreacted molecules. After that, hydrogel was dried and ball milled into powder ready for use.

For the preparation of polytributylhexylphosphonium p-styrene sulfonate (P4446 SS) hydrogel, 3 gram of P4444 SS and 0.8 gram of P4446 SS was blended, into which 33.6 mg of polyethylene glycol dimethacrylate (Mn=198 Da) and 15.4 mg of benzophenone were added. The solution was purged with $N_2$ for 15 minutes and exposed to UV for 2 hours. The copolymer hydrogel was washed, dried and ball milled into powder ready to use.

For the preparation of polymer of sodium salt of styrenesulfonic acid (poly SS Na) hydrogel, 2 gram of sodium p-styrene sulfonate was dissolved in 10 gram water and 24.6 mg N,N'-methylenebis(acrylamide), and 21.7 mg of 2,2'-azobis(2-methylpropionamidine) dihydrochloride was added. After purging with $N_2$ for 15 minutes, the polymerization was conducted at 75° C. for 24 hours. The hydrogel was washed, dried and ball milled into powder ready for use.

For the preparation of copolymer of P4444 SS with NIPAm hydrogel, 3 gram of P4444 SS and 191.7 mg of NIPAm were blended to make a homogeneous solution, into which 33.6 mg of polyethylene glycol dimethacrylate (Mn=198 Da) and 15.4 mg of benzophenone were added. The solution was purged with $N_2$ for 15 minutes and exposed to UV for 2 hours. The copolymer hydrogel was washed, dried and ball milled into powder ready for use.

The PNIPAm and copolymer PNIPAm-PVA hydrogels were prepared in the same manner as described in Example 1 above.

The structure of the monomers are as shown in the Table 4 below:

TABLE 4

The structural formula of different monomers used for preparing the hydrogels

| Monomer | Structure |
|---|---|
| P4444 SS | Bu-P⁺(Bu)(Bu)-Bu attached to styrene-SO₃⁻ |
| P4446 SS | Hex-P⁺(Bu)(Bu)-Bu attached to styrene-SO₃⁻ |
| NIPAm | CH₂=CH-C(=O)-NH-CH(CH₃)₂ |
| SS Na | styrene-SO₃⁻ Na⁺ |

Measurement of Hydrogen Swelling Ratio and Water Flux

The swelling ratio and the water flux generated in forward osmosis process when the hydrogels were used as draw solutes were measured based on the weight increment of the hydrogels. The feed solution used was 2000 ppm NaCl.

Swelling ratio was defined as $SR=(m-m_0)/m_0$, where m is the swollen hydrogel weight, $m_0$ is the initial dry hydrogel weight. Water flux is defined as $WF=\Delta m/(A \cdot t)$, where $\Delta m$ is the weight increment (kg) of the hydrogel within the time (hour) of t, and A is the hydrogel contact area (m²) with membrane used in the forward osmosis process.

Figure 10:
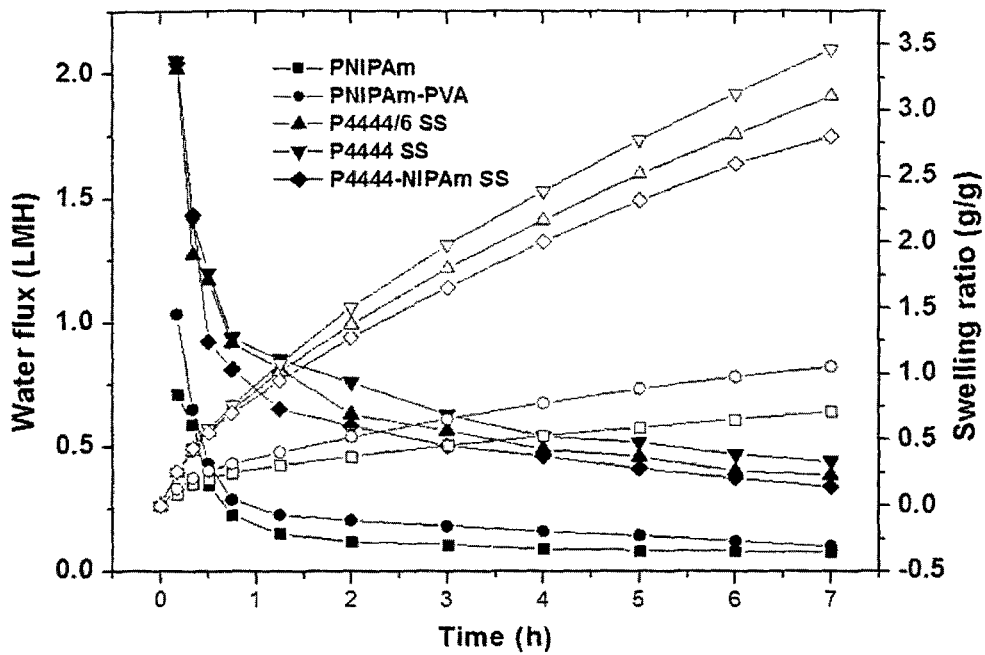
FIG. 10 shows the water flux (solid symbols) and swelling ratio (hollow symbols) profile for different hydrogels.

The results obtained are shown in FIG. 10, with the solid symbols showing the water flux as a function of time, and the hollow symbols showing the swelling ratio as a function of time. In obtaining the results as shown in FIG. 10, the hydrogel contact area with the feed solution was 4.5 cm², and the packing density of the hydrogel was 0.6 g/4.5 cm².

Figure 11:
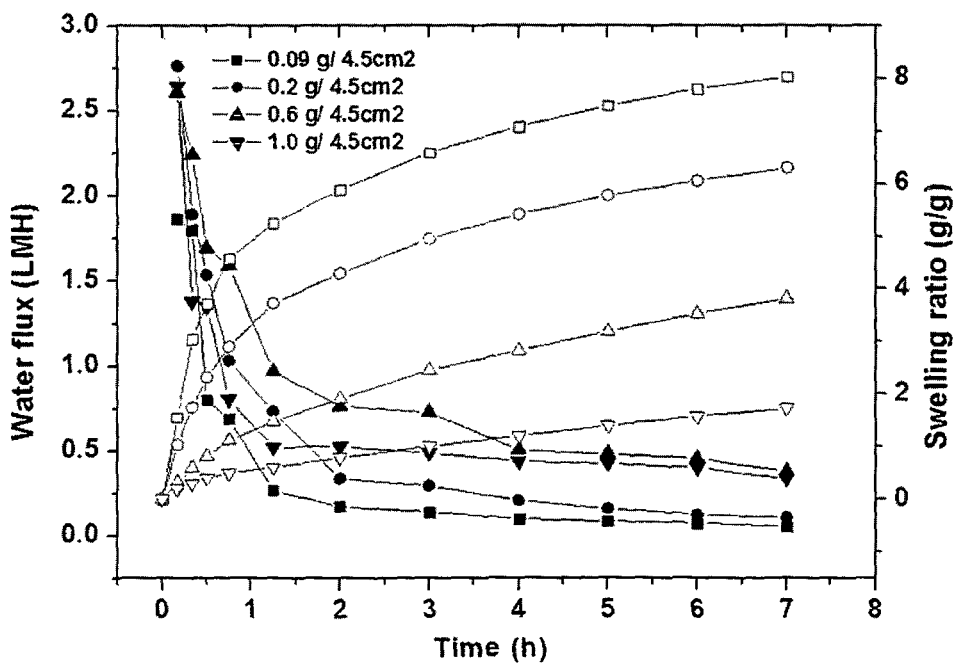
FIG. 11 shows the effect of different packing density of the hydrogel on the water flux (solid symbols) and swelling ratio (hollow symbols)
Figure 12:
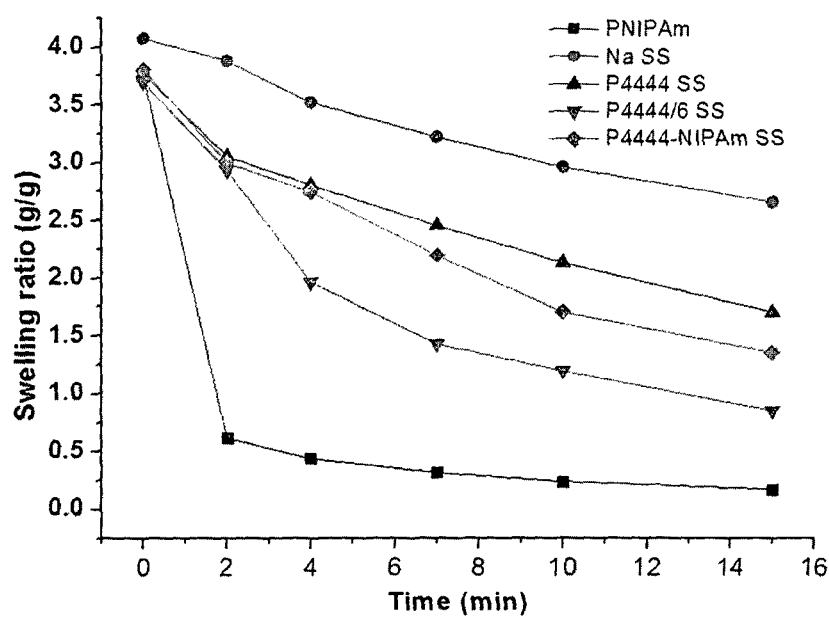
FIG. 12 shows the deswelling profile of different hydrogels at 60° C.

FIG. 11 shows the effect of different packing density on the swelling ratio and water flux for hydrogel comprising copolymer of P4444 SS and P4446 (4:1 mol ratio) hydrogel. FIG. 11 shows that the hydrogel swells faster (swelling ratio increases faster) as packing density is reduced. However, there should be an optimized packing density. As shown in FIG. 12, the P4444-6 SS hydrogel (copolymer) has a swelling ratio of about 1 after 15 minutes of deswelling. From continuous desalination perspective look of FIG. 11, for each packing density, starting from swelling ratio of 1, the swelling ratio increased by ~0.3 within one hour, which is 0.3 g of water for packing density of 1 g/4.5 cm². Similarly, the swelling ratio increased by ~0.8 within one hour and ~0.48 g of water was absorbed for 0.6 g/4.5 cm²; swelling ratio increased by ~3 within one hour and ~0.6 g of water was absorbed for 0.2 g/4.5 cm²; swelling ratio increased by ~4.5 within one hour and ~0.4 g of water was absorbed for packing density of 0.09 g/4.5 cm². Accordingly, it can be seen that a packing density of 0.2 g/4.5 cm² is optimal.

Measurement of Hydrogen Deswelling 2 g of swollen hydrogels with swelling ratio of about 4 is put on a hot plate with surface temperature of 60° C. The hydrogel's contact area with the hotplate was 4.5 cm². The hydrogel's weight was measured periodically to monitor the hydrogel's swelling ratio. The results obtained are shown in FIG. 12.

In FIG. 12, SS Na represents the typical polyelectrolyte hydrogel which normally is not thermally responsive, and its weight loss is relatively slow due to water evaporation. While the other extreme is PNIPAm hydrogel, which is typically non-ionic and thermally responsive, deswells very fast.

Measurement of LCST

The lower critical solution temperature (LCST) of each hydrogel was determined by a differential scanning calorimeter (TA Q10 Modulated DSC, TA Instruments) (DSC). The hydrogels were swollen to swelling ratio of about 3 before the DSC measurement. For each DSC measurement, approximately 20 mg of swollen hydrogel was placed into a hermetically sealed aluminium pan. The temperature range was from 20° C. to 70° C. at a heating rate of 1° C./min. Dry nitrogen was used for purging at a flow rate of 50 mL/min.

Figure 13:
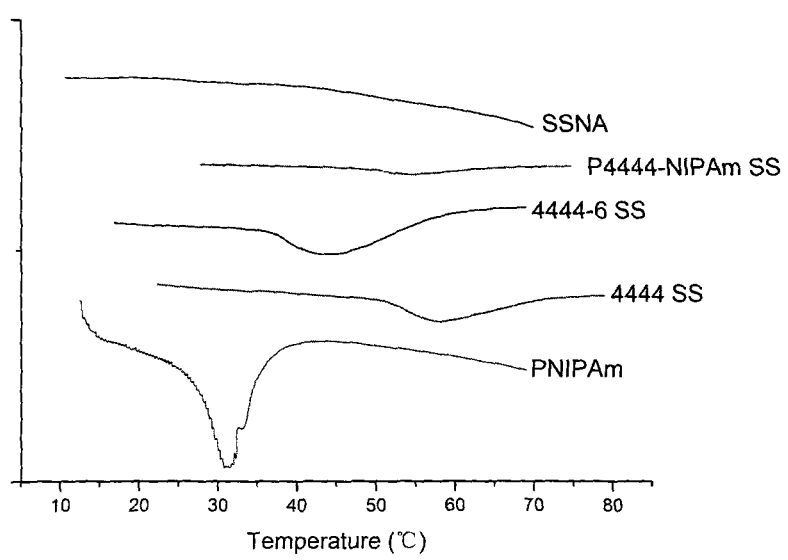
FIG. 13 shows the LCST of various polyionic liquid hydrogels and their copolymers. In particular, the LCST of P4444 SS, P4444-6 SS and P4444-NIPAm SS is about 58° C., 45° C. and 55° C., respectively.

The results are shown in FIG. 13. The P4444 SS polyionic liquid hydrogel was thermally responsive with LCST of ~60° C., so at 60° C. it deswelled slowly although still faster than SS Na hydrogel. By copolymerizing with 20% mol of NIPAm, the LCST did not decrease (~58° C.) but with the presence of NIPAm segments, deswelling performance improved. Further, by copolymerizing with 20% mol of P4446 SS, which is hydrophobic, the LCST reduced to ~45° C. and the deswelling rate was accelerated.

From the results obtained, it can be seen that polyionic liquid hydrogels of P4444 SS, P4444-6 SS and P4444-NIPAm SS are thermally responsive since peaks are seen in FIG. 13 while SS Na is non-thermally responsive since there is no peak.

Whilst the foregoing has described exemplary embodiments, it will be understood by those skilled in the technology concerned that many variations in details of design, construction and/or operation may be made without departing from the present invention.

REFERENCES

1. Li, Y. et al, 2004, "Study on the synthesis and application of salt-resisting polymeric hydrogels", Polymers for Advanced Technologies, 15(12):34-38; and
2. Yamashita K. et al, 2003, "Preparation of IPN-type stimuli-responsive heavy-metal ion adsorbent gel", Polymers for Advanced Technologies, 14:189-194.

What is claimed is:

1. A system for forward osmosis comprising an aqueous feed solution, and a draw solution comprising a draw solute comprising a semi-interpenetrating (semi-IPN) hydrogel, wherein the semi-IPN hydrogel comprises at least one thermally responsive polymer and at least one hydrophilic polymer, wherein:

the semi-IPN hydrogel has a repeat unit molar ratio corresponding to a ratio of moles of repeat units of the hydrophilic polymer to moles of repeat units of the thermally responsive polymer, wherein the repeat unit molar ratio is from 0.25:1 to 1:1;

the semi-IPN hydrogel switches between a hydrophilic state to allow absorption of water osmosed from a feed solution and a hydrophobic state to allow release of the absorbed water in response to changes in temperature;

the semi-IPN hydrogel is selected from the group consisting of: poly(N-isopropylacrylamide)/polysodium acrylate (PNIPAm/PSA), poly(N-isopropylacrylamide)/polyvinyl alcohol (PNIPAm/PVA), and combinations thereof;

the semi-IPN hydrogel is capable of being dewatered by heating to a temperature of about 40° C. in the absence of UV light; and the semi-IPN hydrogel has a reversible swelling ratio span of at least 0.45, where the reversible swelling ratio span is the difference between the end point swelling ratio and the onset point swelling ratio, where the swelling ratio at a time t is $(W_t - W_d)/W_d$, where $W_t$ is weight of hydrogel at time t and $W_d$ is the weight for the completely dry state;

the end point swelling ratio is the swelling ratio of the hydrogel at the end of a room temperature forward osmosis drawing process when the water flux is reduced to 0.1 LMH; and the onset point swelling ratio is the plateau swelling ratio after dewatering in water at 40° C. in the absence of UV light.

2. The system according to claim 1, wherein the semi-IPN hydrogel is in the form of a bulk hydrogel, continuous film or particle aggregate.

3. The system according to claim 1, wherein the semi-IPN hydrogel is capable of switching from the hydrophilic state to the hydrophobic state when the semi-IPN hydrogel is heated to a temperature above a lower critical solution temperature (LCST) of the semi-IPN hydrogel.

4. The system according to claim 1, wherein the semi-IPN is capable of switching from the hydrophilic state to the hydrophobic state when the semi-IPN hydrogel is heated to a temperature of 30-70° C.

5. The system according to claim 1, wherein the draw solute comprises a composite of semi-IPN hydrogel and carbon particles.

6. The system according to claim 1, wherein the draw solute comprises a composite of semi-IPN hydrogel and clay.

7. The system according to claim 1, wherein the LCST of the draw solute is from 30-55° C.

8. A forward osmosis method comprising:

contacting an aqueous feed solution and a draw solution comprising a draw solute via a semi-permeable membrane positioned therebetween, such that teed water in the aqueous feed solution passes through the semi-permeable membrane by osmotic pressure and moves into the draw solute in the draw solution, wherein the draw solute is a semi-interpenetrating (semi-IPN) hydrogel comprising at least one thermally responsive polymer and at least one hydrophilic polymer wherein the semi-IPN hydrogel has a repeat unit molar ratio corresponding to a ratio of moles of repeat units of the hydrophilic polymer to moles of repeat units of the thermally responsive polymer; wherein the repeat unit molar ratio is from 0.25:1 to 1:1; wherein the semi-IPN hydrogel is selected from the group consisting of: poly(N-isopropylacrylamide)/polysodium acrylate (PNIPAm/PSA), poly(N-isopropylacrylamide)/polyvinyl alcohol (PNIPAm/PVA) and combinations thereof and wherein the semi-IPN hydrogel is capable of being dewatered by heating to a temperature of about 40° C. in the absence of UV light; and separating the water from the draw solute to form a purified water product.

9. The forward osmosis method according to claim 8, wherein the semi-IPN hydrogel is in the form of a bulk hydrogel, continuous film or particle aggregate.

10. The forward osmosis method according to claim 8, wherein the aqueous feed solution is at least one of an aqueous saline solution, seawater, brine, brackish water, mineralized water, or industrial waste water.

11. The forward osmosis method according to claim 8, wherein the separating comprises heating the draw solute.

12. The forward osmosis method according to claim 11, wherein the separating comprises heating the draw solute at a temperature above a lower critical solution temperature (LCST) of the draw solute.

13. The forward osmosis method according to claim 11, wherein the heating is at a temperature of 30-70° C.

14. The forward osmosis method according to claim 8, wherein the contacting is carried out at room temperature.

15. The forward osmosis method according to claim 8, further comprising conditioning the draw solute prior to the contacting.

16. The forward osmosis method according to claim 15, wherein the conditioning comprises swelling the hydrogels prior to the contacting.

17. The forward osmosis method according to claim 8, wherein the semi-permeable membrane comprises hollow fibers.

18. The forward osmosis method according to claim 17, wherein the hollow fibers are coated with at least one layer of the draw solute.

* * * * *